(12) United States Patent
Bunyard

(10) Patent No.: US 7,934,694 B2
(45) Date of Patent: May 3, 2011

(54) ACTUATOR WITH SPRING RETURN PISTON

(75) Inventor: Alan Bunyard, Brighton (GB)

(73) Assignee: Forac Limited, West Sussex (GB)

( * ) Notice: Subject to any disclaimer, the term of this patent is extended or adjusted under 35 U.S.C. 154(b) by 896 days.

(21) Appl. No.: 11/710,618

(22) Filed: Feb. 26, 2007

(65) Prior Publication Data
US 2008/0006790 A1 Jan. 10, 2008

(30) Foreign Application Priority Data

Apr. 26, 2006 (GB) .................................. 0608256.4

(51) Int. Cl.
*F16K 31/12* (2006.01)
(52) U.S. Cl. ............. 251/58; 251/62; 251/250; 251/337
(58) Field of Classification Search .................... 251/58, 251/62, 250, 337; 92/130 R, 130 C, 130 D, 92/136
See application file for complete search history.

(56) References Cited

U.S. PATENT DOCUMENTS

| | | | | | |
|---|---|---|---|---|---|
| 1,834,607 | A | * | 12/1931 | Fred Dove | 91/342 |
| 2,319,964 | A | * | 5/1943 | Wilson | 137/629 |
| 2,355,520 | A | * | 8/1944 | Fischer et al. | 72/441 |
| 2,640,368 | A | * | 6/1953 | Schjolin | 74/336.5 |
| 2,796,856 | A | * | 6/1957 | Louis | 123/179.31 |
| 3,003,317 | A | * | 10/1961 | Schroeder et al. | 60/394 |
| 3,011,483 | A | * | 12/1961 | Frick et al. | 91/374 |
| 3,232,175 | A | * | 2/1966 | Cox, Jr. et al. | 91/170 R |
| 3,274,903 | A | * | 9/1966 | Fische et al. | 92/13.6 |
| 3,332,660 | A | * | 7/1967 | Slawinski et al. | 251/14 |
| 3,709,098 | A | * | 1/1973 | Lloyd | 91/46 |
| 3,822,438 | A | * | 7/1974 | Takenaka | 16/62 |
| 4,073,033 | A | * | 2/1978 | Lexnas | 16/52 |
| 4,260,128 | A | * | 4/1981 | Tito | 251/58 |
| 4,281,588 | A | * | 8/1981 | Jaske | 91/290 |
| 4,352,320 | A | * | 10/1982 | Stoll | 92/13 |
| 4,378,612 | A | * | 4/1983 | Beers | 16/62 |
| 4,457,210 | A | * | 7/1984 | Pauliukonis | 91/355 |
| 4,487,111 | A | * | 12/1984 | Prince | 92/110 |
| 4,637,423 | A | * | 1/1987 | Gray | 137/382.5 |
| 4,651,626 | A | * | 3/1987 | Messina | 92/13.6 |
| 4,700,735 | A | * | 10/1987 | Hamernik et al. | 137/270 |
| 4,794,847 | A | * | 1/1989 | Kreuter et al. | 92/136 |
| 4,875,404 | A | * | 10/1989 | Aldridge | 92/130 A |
| 5,003,864 | A | * | 4/1991 | Dyer | 92/132 |
| 5,018,434 | A | * | 5/1991 | Haka | 92/29 |
| 5,187,835 | A | * | 2/1993 | Lee | 16/52 |
| 5,411,239 | A | * | 5/1995 | Sorensen | 251/58 |
| 5,492,050 | A | | 2/1996 | Holtgraver | 92/74 |
| 5,560,282 | A | * | 10/1996 | Trenner et al. | 92/136 |
| 5,653,419 | A | | 8/1997 | Uchisawa et al. | 251/58 |
| 6,003,432 | A | | 12/1999 | Laulhe | 92/69 R |
| 6,053,251 | A | * | 4/2000 | Deaton | 166/321 |

(Continued)

FOREIGN PATENT DOCUMENTS

DE 2627599 A1 6/1976

(Continued)

*Primary Examiner* — John K Fristoe, Jr.
*Assistant Examiner* — Marina Tietjen
(74) *Attorney, Agent, or Firm* — Levy & Grandinetti

(57) ABSTRACT

An actuator comprising a cylinder and a spring return piston provided with linkage means, in which one or more return springs are situated on the same side of the piston as the linkage means.

26 Claims, 4 Drawing Sheets

U.S. PATENT DOCUMENTS

| | | | | |
|---|---|---|---|---|
| 6,776,083 B2 | * | 8/2004 | Helasuo et al. | 92/136 |
| 2003/0024239 A1 | * | 2/2003 | Massey et al. | 60/406 |
| 2005/0166752 A1 | * | 8/2005 | Nomura | 92/5 R |
| 2007/0000341 A1 | * | 1/2007 | Arlt et al. | 74/409 |
| 2007/0193259 A1 | * | 8/2007 | Parker et al. | 60/324 |
| 2008/0264497 A1 | * | 10/2008 | Rodriguez et al. | 137/553 |

FOREIGN PATENT DOCUMENTS

| | | |
|---|---|---|
| DE | 2707306 A1 | 2/1977 |
| FR | 2557252 * | 9/1983 |

\* cited by examiner

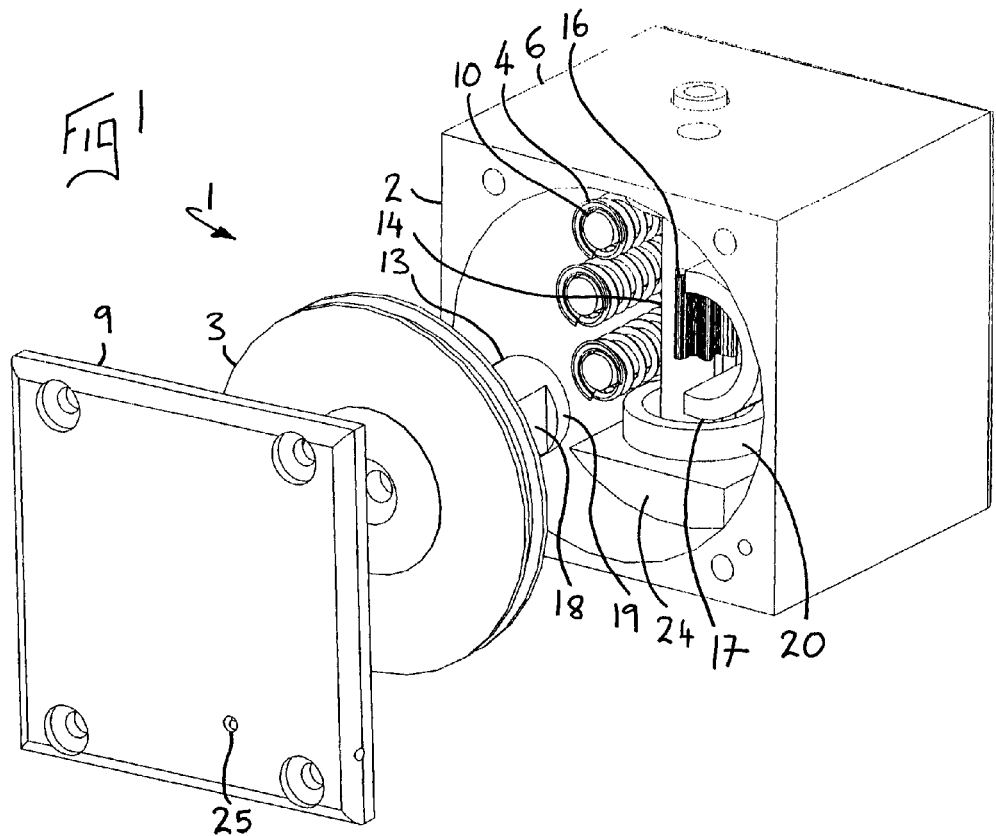
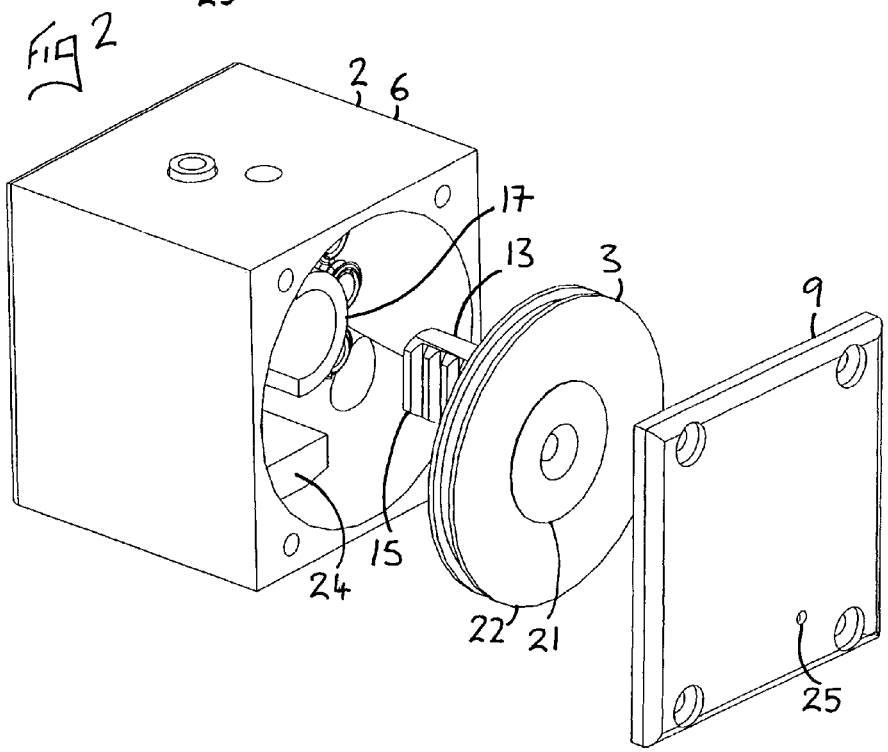

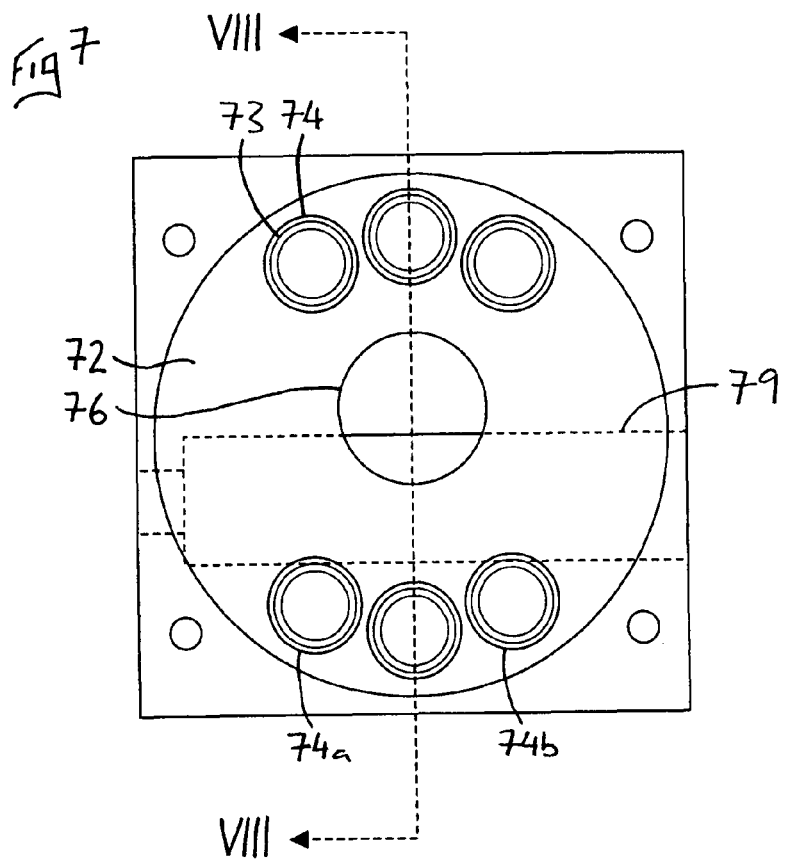
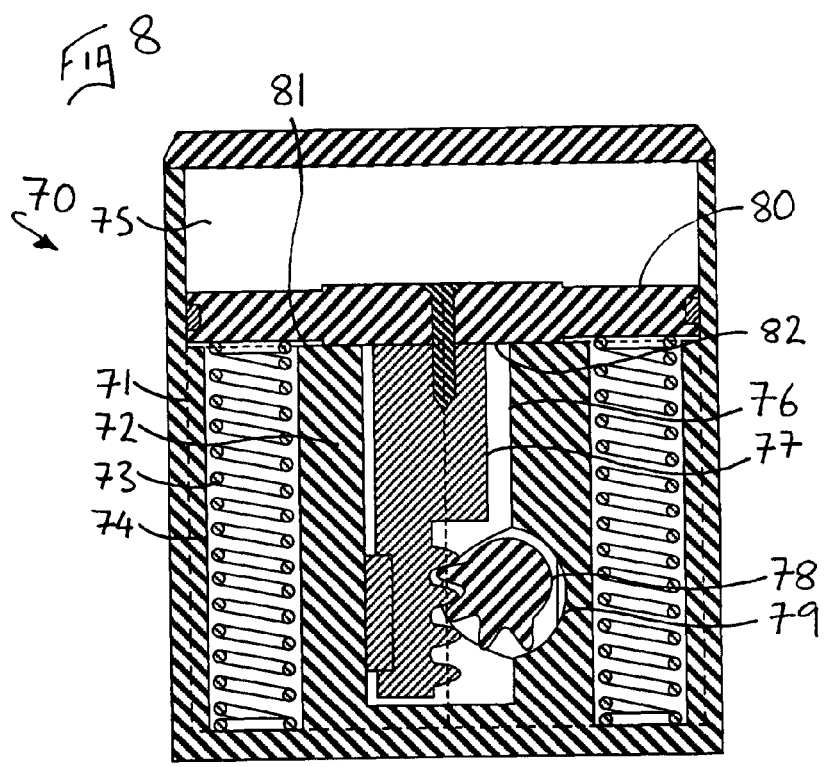

ACTUATOR WITH SPRING RETURN PISTON

The Applicant claims priority to Great Britain Application Number 0608256.4, which was filed on Apr. 26, 2006.

This invention relates to an actuator with a spring return piston, for use particularly, but not exclusively, as a fluid driven valve actuator.

Known single action actuators comprise a pressure chamber and an outer chamber axially aligned with the pressure chamber. The piston is housed in the pressure chamber and is forced in a first direction, towards the outer chamber, by pressurised fluid forced into the pressure chamber. The return springs are housed in the outer chamber, and are mounted between an end of the outer chamber and the piston. The springs are compressed when the piston is forced in the first direction, and when the pressure in the pressure chamber is reduced the springs force the piston back in a second direction. A rack mounted on the piston, and a pinion lateral to the rack, are housed in the pressure chamber, and as such the pressure chamber is sometimes referred to as the "inner chamber". Movement of the piston back and forth moves the rack, which rotates the pinion.

These known constructions of single action actuators suffer from a number of drawbacks. Firstly, as the pinion is housed in the pressure chamber, it is necessary to provide pressure seals at either end where the pinion exits the pressure chamber. Combined with the seal on the piston, this means that known actuators must comprise three seals. As these components can fail in use the chances of malfunction are greater than if fewer seals were needed.

Secondly, known actuators must be large enough to contain both the pressure chamber and the outer chamber. The size of the outer chamber is determined by the size of the springs when compressed. The size of an actuator can be a prime concern, in particular where it must be mounted to a valve in restricted space.

The present invention is intended to overcome some of the above problems.

Therefore, according to the present invention an actuator comprises a cylinder and a spring return piston provided with linkage means, in which one or more return springs are situated on the same side of the piston as the linkage means.

(In known actuators the chamber in which the linkage means are disposed is referred to as the "inner chamber", while the chamber in which the return springs are housed is referred to as the "outer chamber". However, these terms are no longer applicable with the actuator of the present invention because the linkage means and the return springs are housed in the same chamber. Therefore, in the following description and Claims the term "pressure chamber" refers to the chamber which is pressurised in use, and the term "inner chamber area" refers to the chamber area on the opposite side of the piston to the pressure chamber, which in known actuators would be referred to as the "outer chamber", by virtue of the fact that it was not the pressure chamber. As the springs are necessarily on the opposite side of the piston to the pressure chamber, it is the "inner chamber area" which houses the linkage means and the one or more return springs in the present invention.)

(The term "linkage means" refers to any mechanical linkage which can transfer the linear motion of the piston into the rotary output of the actuator. The most common arrangement in valve actuators is a rack and pinion, as described below, but it will be appreciated that the invention is not restricted to such an arrangement.)

Thus, the actuator of the present invention can be smaller than known arrangements, because there is no need to have extra axial length to provide for the compressed springs. They are now situated alongside the linkage means. In addition, an actuator according to the present invention does not require pressure seals at each end of a pinion, as the pinion is no longer disposed in a pressurised chamber.

Therefore, preferably the one or more return springs can be arranged within an inner chamber area, the diameter of which can be axially aligned with the diameter of a pressure chamber defined by the cylinder. The one or more return springs can comprise one or more coil springs which can be substantially parallel with the cylinder. This is the simplest and most expedient arrangement of the invention.

It will be appreciated that if one or more coil springs are used, they may need to be comparatively long in length in order to provide the sufficient return force. As the inner chamber area described above is quite constricted, it can be necessary to ensure that the one or more coil springs do not bend laterally in use. Therefore, in a preferred construction the one or more return springs can be provided with support means adapted to support said one or more springs along part or all of their axial length.

In one arrangement of the invention the support means can comprise a rod disposed inside each of said one or more coil springs. The one or more rods can extend from a bottom of the inner chamber area, and if so a clearance gap can be provided between the one or more rods and the lowest stroke position of the underside of the piston, such that the piston does not hit the rods in use. The "underside" of the piston being the side opposite to the pressure chamber.

In an alternative construction the one or more rods can extend from the underside of the piston, and if so a clearance gap can be provided between the one or more rods and a bottom of the inner chamber area when the piston is at its lowest stroke position, such that the rods do not hit the bottom of the inner chamber area in use.

In one embodiment of the invention a body can be disposed within the inner chamber area, and the support means can comprise one or more chambers formed in said body, each of which can be adapted to receive one of said one or more springs. A clearance gap can be provided between the body and the lowest stroke position of the underside of the piston, such that the piston does not hit the body in use.

Regardless of the construction of the support means, the linkage means can comprise a rack and pinion arrangement. The rack can extend from the underside of the piston, and it can co-operate with a rotatable pinion mounted in the inner chamber area, and arranged normal to the rack. Thus, the rack and pinion arrangement is much as it is in some known constructions, except that the one or more springs are arranged around it within the inner chamber area.

The pitch line of the rack can be aligned with the centre of the piston so forces applied to the piston in use transfer in a linear fashion to the pinion, and visa versa. This prevents the piston from pitching to one side in use. The rack itself can be offset to one side to allow for its pitch line to be aligned with the centre of the piston. A screw can secure the rack to the piston, and the screw can also be aligned with the centre of the piston. Again, such an arrangement ensures that a central linear loading is applied to the screw in use, which eliminates any potentially harmful lateral loadings. With the piston and rack arranged thus there is no need for a bearing on the piston.

In embodiments in which the inner chamber area is an open space, a bearing sleeve can be provided therein, which partially surrounds the rack, and a bearing body can be provided between the rack and the bearing sleeve. Thus, a smooth and controlled linear motion can be achieved.

In the embodiment in which the inner chamber area is filed with a body, the body can be provided with a bearing chamber in which the rack is disposed, and a bearing body can be provided between the rack and the bearing chamber. Again, this ensures that a smooth and controlled linear motion can be achieved.

The opinion can be provided with bearings at each end to ensure that it rotates smoothly. Thus, the separating force between the rack and pinion is contained between the bearing body and the roller bearings.

Preferably the movement of the piston from its highest stroke position to its lowest stroke position can rotate the pinion through substantially 90 degrees. In other words the actuator can be a 90 degree actuator which can be used in all situations where a valve must be moved through 90 degrees. It will be appreciated that the invention is not restricted to such an arrangement, and it can be used with an actuator which provides more than 90 degrees of movement. The pinion can be provided with three or four teeth.

It will be appreciated that a yoke, or any other known arrangement, could also be employed with the invention instead of geared teeth.

In a preferred arrangement of the invention six coil springs can be provided. It will be appreciated that any number of springs could be provided, but it has been found that six, arranged in groups of three on either side of the rack, works well. In particular, providing for six springs allows a degree of flexibility in use, as two or four can be removed to reduce the spring return force. Thus 100 psi, 80 psi and 60 psi of return force can be readily provided with the same construction.

In order to allow for six coil springs in the inner chamber area, the rack and pinion must be shaped and dimensioned to provide sufficient space. In particular, the diameter of the pinion body can be less than the outer diameter of the pinion teeth. In other words, the pinion teeth can sit proud of the pinion.

In one embodiment the piston can be provided with a raised central section on its crown and on its underside. This feature ensures that when the piston contacts the top and the bottom of the pressure chamber, it does so in the middle. If the piston does pitch slightly to one side, the raised central section will still contact the top or bottom of the pressure chamber before any edge part does. This prevents any undue lateral loading being applied to the piston, the screw or the rack in use, which might lead them to expire.

The actuator can be powered in any of the known ways, including by any fluid, liquid or gas, and preferably it can be a valve actuator.

Three embodiments of the invention will now be described by way of example and with reference to the accompanying drawings, in which:

FIG. 1 is an exploded perspective view of an actuator according to the present invention;

FIG. 2 is a further exploded perspective view of the actuator shown in FIG. 1;

FIG. 7 is a top view of a third actuator according to the present invention; and, FIG. 8 is a cross-sectional side view of the actuator shown in FIG. 7.

Figure 3:
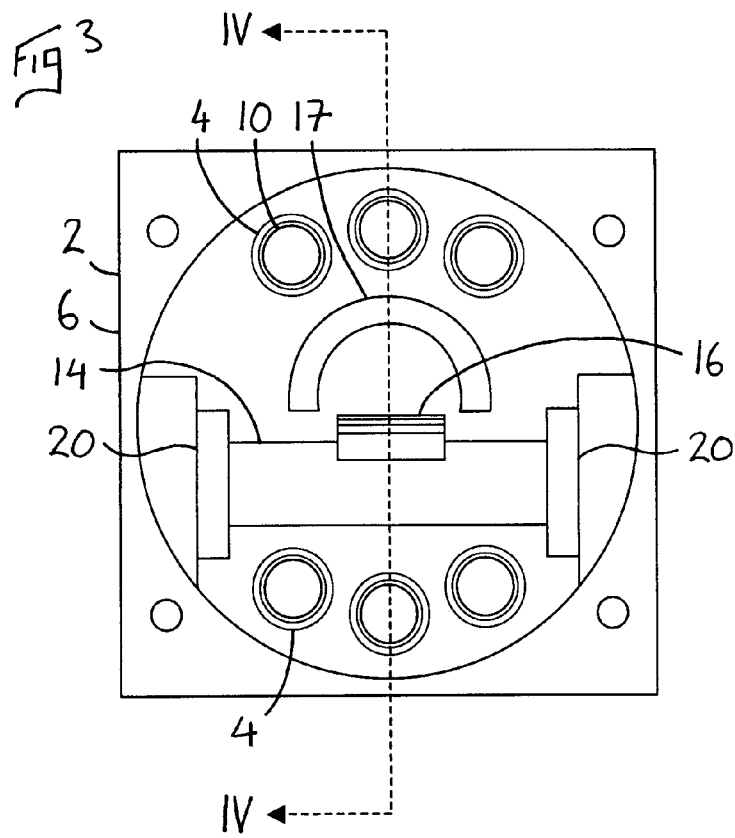
FIG. 3 is a top view of the actuator shown in FIG. 1.

As shown in FIG. 1 an actuator 1 comprises a cylinder 2 and a spring return piston 3 provided with linkage means in the form of rack 13 and pinion 14, in which one or more return springs 4 are situated on the same side of the piston 3 as the linkage means (13, 14).

(The piston 3, and the cover plate 9, are not shown in FIG. 3 for ease of explanation of the invention. The same is true of FIGS. 5 and 7 described below.)

Figure 4:
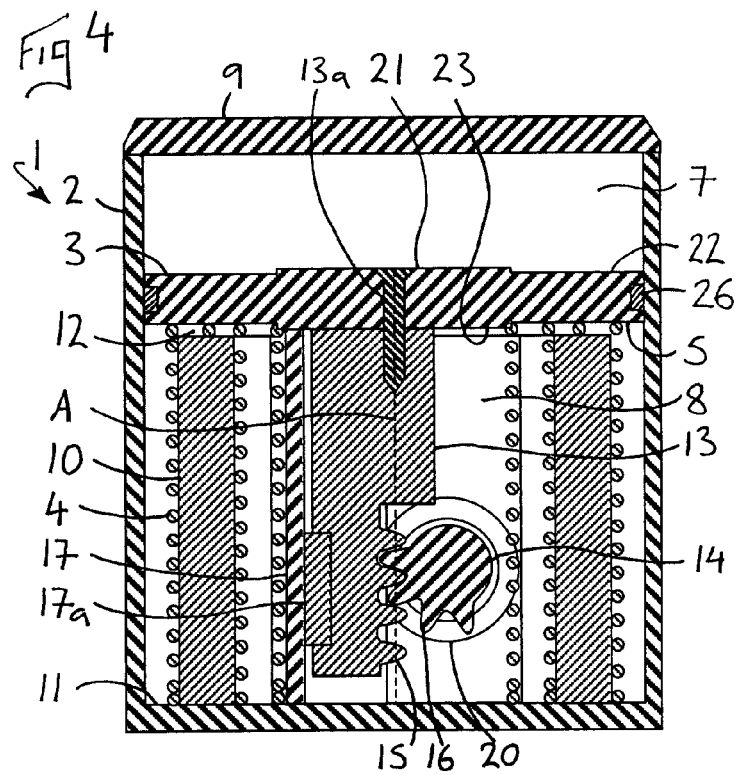
FIG. 4 is a cross-sectional side view of the actuator shown in FIG. 3.

The actuator 1 is constructed from a block 6, which defines the cylinder 2 and which houses the moving components of the actuator 1. Referring to FIG. 4, the cylinder 2 comprises pressure chamber 7, and inner chamber area 8 which is an open space arranged beneath the pressure chamber 7. As is clear from the Figures the diameter of the inner chamber area 8 is axially aligned with the diameter of the pressure chamber 7.

The piston 3 is housed in the pressure chamber 7, which is sealed with cover plate 9. The return springs 4 comprise six coil springs, which are arranged parallel with the cylinder 2, and which are disposed within the inner chamber area 8, underneath the piston 3. Each spring 4 is provided with support means to prevent lateral movement, in the form of rods 10, which extend from a bottom 11 of the inner chamber area 8. Referring to FIG. 4, the rods 10 are of such length that a clearance gap 12 is provided between them and the piston 3, when the piston 3 is at its lowest stroke position.

Rack 13 extends from the underside 5 of the piston 3, and it co-operates with rotatable pinion 14 mounted laterally in the inner chamber area 8. The rack 13 and the pinion 14 only have four teeth 15 and 16, and movement of the piston 3 from its highest stroke position to its lowest stroke position rotates the pinion 14 through 90 degrees.

The pitch line of the rack, as indicated by hashed line A, is aligned with the centre of the piston 3 so forces applied to the piston 3 in use transfer in a linear fashion to the pinion 14, and visa versa. As such the rack 13 is offset to one side. A screw 13a (not shown in FIGS. 1 and 2), secures the rack 13 to the piston 3. As is clear from FIG. 4, the screw 13a is also aligned with the centre of the piston 3.

A bearing sleeve 17 is provided in the inner chamber area 8 which partially surrounds the rack 13. The sleeve 17 is a part-cylinder which extends through more than 180 degrees, and therefore laterally contains the rack 13. A bearing body 17a is provided between the rack 13 and the bearing sleeve 17. The bearing body 17a is a resilient body which fits into recess 18 provided at the rear 19 of the rack 13. The bearing body 17a sits proud of the rear 19 of the rack 13, and therefore engages with the bearing sleeve 17 to ensure a smooth and controlled linear motion is achieved between the rack 13 and the bearing sleeve 17. The pinion 14 is mounted on bearings 20 at each end.

As is clear from the Figures, the six coil springs 4 are arranged into two groups of three, arranged on either side of the rack 13 and pinion 14. This arrangement provides a balanced and linear spring return pressure force. The rack 13, the pinion 14, the bearing sleeve 17 and the springs 4 and rods 10 are all obviously dimensioned to fit together inside the inner chamber area 8.

In particular, as is clear from FIG. 3, the diameter of the pinion 14 is less than the outermost diameter of the pinion teeth 16. Thus, the pinion is narrow and allows sufficient space behind it for three springs 4, and the pinion teeth 16 are proud of the pinion 14.

The piston 3 is provided with a raised central section 21 on its crown 22 and a raised central section 23 on its underside 5, which are both annular. As such it is these central sections 21 and 23 which contact the top and the bottom of the pressure chamber 7 in use.

The top of the pressure chamber 7 is defined by the cover plate 9, and the bottom is defined by the top of the bearing sleeve 17. Thus, the top of the bearing sleeve 17 defines the lowest possible stroke position of the piston 3, as shown in FIG. 4, because the piston 3 cannot travel beyond it. It therefore also defines the boundary between the pressure chamber 7 and the inner chamber area 8. The rods 10 do not reach the level of the top of the bearing sleeve 17, and as such clearance gap 12 is provided.

Bosses 24 are formed in the cylinder 2, which hold bearings 20 supporting the pinion 14.

The piston 3 is provided with an O-ring pressure seal 26 around its peripheral edge (only shown in FIG. 4).

In use a pressure fluid (not shown) is introduced to the pressure chamber 7 via an aperture 25 in the cover plate 9. The pressure of the fluid exceeds the extension force of the springs 4, and therefore the piston 3 is forced down to the bottom of its stroke, to the position shown in FIG. 4. The pressure is then reduced until it is less than the extension force of the springs 4, and they push the piston 3 back up to the top of its stroke. This process is repeated many times over to operate the actuator 1. The pressure seal 26 isolates the pressure chamber 7 from the inner chamber area 8.

When the piston 3 is forced downwards the teeth 15 of the rack 13 engage the teeth 16 of the pinion 14, and the pinion 14 is rotated through 90 degrees in an anti-clockwise direction. When the piston 3 is forced back up, the pinion 14 is rotated back through 90 degrees in a clockwise direction. The pinion 14 is connected to a valve (not shown), and the rotation back and forth opens and closes the valve.

When the springs 4 are compressed and extended as described above they do not bend laterally because they are supported by the rods 10. The section of spring 4 which is proud of the top of the rods 10, and therefore unsupported, is too short to bend laterally sufficiently to cause any problems.

As the pitch line A of the rack 13 is aligned with the centre of the piston 3, the loading placed on the rack 13 and the piston 3 when the piston 3 moves up and down is linear and balanced. Therefore, the piston 3 does not pitch to one side in use.

The separating force generated between the rack 13 and pinion 14 in use is contained between the bearing body 17a and the bearings 20, which ensures that the pitch line A remains central with the piston 3.

When the piston 3 reaches the top of its stroke, the raised central section 21 contacts the cover plate 9. This arrangement ensures that if the piston 3 does pitch slightly to one side, the first point of contact between the piston 3 and the cover plate 9 will still be part of the raised central section 21. This prevents any edge part of the piston 3 from hitting the cover plate 9, which might place an undue lateral loading on the piston 3, the screw 13a or the rack 13 in use, which might lead them to expire.

Likewise, when the piston 3 reaches the bottom of its stroke, as shown in FIG. 4, the raised central section 23 contacts the top of the bearing sleeve 17. Again, this arrangement ensures that if the piston does pitch slightly to one side in use its first point of contact will still be relatively central, so no undue lateral loadings will be placed on the components.

When the piston 3 reaches the bottom of its stroke it does not come into contact with the rods 10 due to the clearance gap 12 between them and the top of the bearing sleeve 17.

The arrangement of the springs 4 in two groups of three ensures that the extension force applied to the underside 5 of the piston 3 is equally balanced. It will be appreciated that this arrangement is also advantageous because it effectively utilises the space in the inner chamber area 8 around the rack 13 and pinion 14.

In addition, the use of six springs allows for a degree of flexibility, as two or four of the springs 4 can be removed to reduce the spring return force. Thus 100 psi, 80 psi and 60 psi of return force can be readily provided with the same construction. It is simply a matter of removing the cover plate 9 and the piston 3 from the actuator 1 to gain access to the springs 4, and then simply removing the desired number therefrom. Clearly, the same spring pressure must be provided on each side of the rack 13 and pinion 14 to ensure that a linear and balanced spring return force is always provided.

Thus, a simple and expedient arrangement is provided in which the return springs 4 and the linkage means 13, 14 are disposed on the same side of the piston 3. The main advantages of this are a space saving because there is no need to provide extra axial space to house the compressed springs because they are axially situated in the same space as the rack 13 and pinion 14, and a reliability improvement because only one pressure seal, O-ring 26, is needed to seal the pressure chamber 7.

Figure 5:
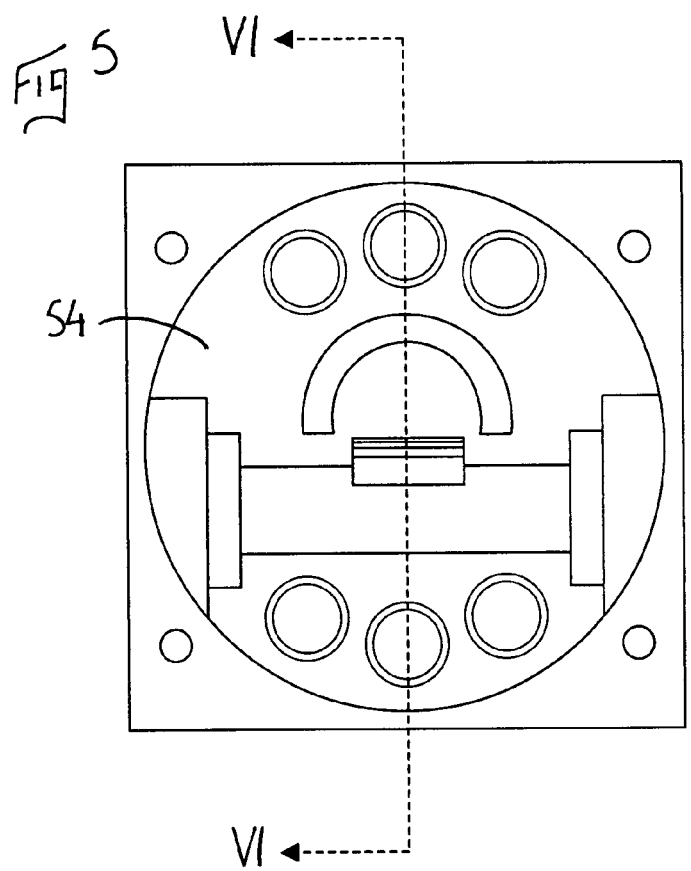
FIG. 5 is a top view of a second actuator according to the present invention.
Figure 6:
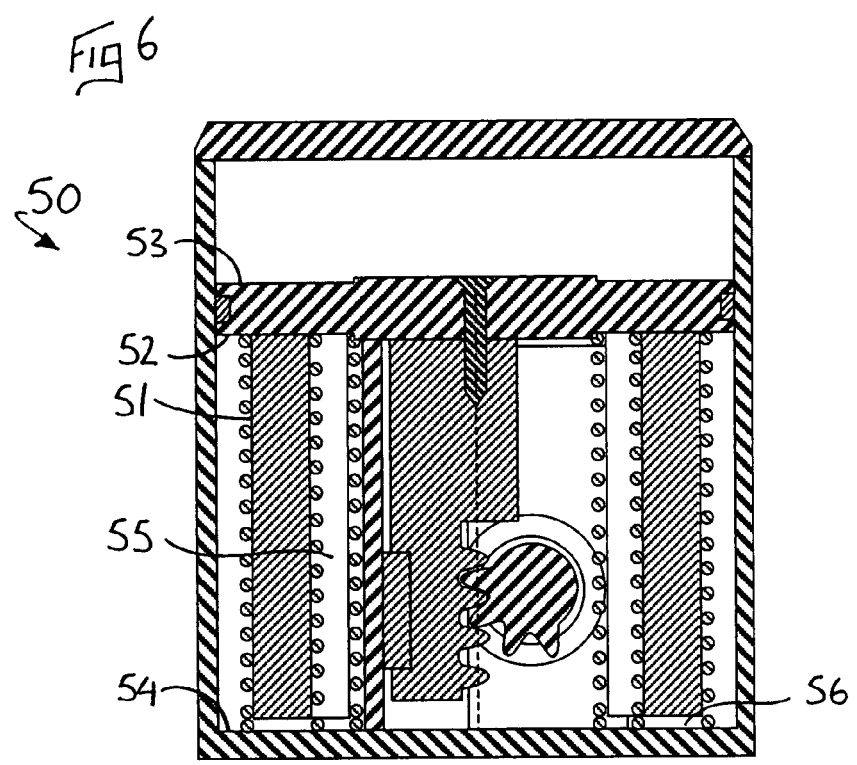
FIG. 6 is a cross-sectional side view of the actuator shown in FIG. 5.

Two further examples of the invention are shown in FIGS. 5 to 8. (As explained above FIGS. 5 and 7 do not show the piston, not the cover plate for ease of explanation of the invention.) In FIGS. 5 and 6 actuator 50 is similar in construction to actuator 1 described above, except that the rods 51 are mounted to the underside 52 of the piston 53, as opposed to the bottom 54 of the inner chamber area 55.

Referring to FIG. 6, the rods 51 are of such length that a clearance gap 56 is provided between them and the bottom 54 of the inner chamber area 55, when the piston 53 is at its lowest stroke position. Thus, in use the rods 51 do not hit the bottom 54 of the inner chamber area 55.

In FIGS. 7 and 8 actuator 70 is similar in functionality to actuator 1 described above, but the physical construction is different. Instead of the inner chamber area being an open space in which the moving components of the actuator are housed, in actuator 70 the inner chamber area 71 is machined from a block. As such, a body 72 is disposed within the inner chamber area 71, and the support means for the springs 73 comprises chambers 74 formed in said body 71. Thus, the inner chamber "area" 71 in this case is an area of the block below the pressure chamber 75, as opposed to an actual open space. This area is defined with a hashed line in FIG. 8.

Further, with this construction there is no need to have a bearing sleeve as with actuator 1 described above. Instead bearing chamber 76 is formed in the body 72, and the rack 77 is disposed therein. The same rack pitch line and bearing arrangement as described above in relation to actuator 1 is employed in actuator 70.

In order to allow for the pinion 78 a pinion cavity 79 (shown in hashed lines in FIG. 7) is formed laterally in the body 72. The pinion cavity 79 does in fact overlap to a small degree with two of the chambers 74a and 74b, but the pinion 78 does not come into contact with any of the springs 73.

Thus, in use actuator 70 operates in the same manner as actuators 1 and 50 described above, except that the springs 73 are supported from the outside rather than the inside, and fewer component parts are required.

In use the piston 80 contacts the top 81 of the body 72. The same arrangement of raised central sections on the piston 80 is used as in actuator 1 described above. Thus, when the piston 80 reaches the bottom of its stroke, as shown in FIG. 8, it is raised central section 82 which contacts the body 72.

The embodiments described above can be altered without departing from the scope of Claim 1. In particular, in alternative arrangements (not shown) other numbers of springs are provided than six, and they are arranged in other ways. For example two springs can be provided, one on either side of the rack and pinion.

In addition, in further alternative embodiments (not shown) the actuators are adapted to provide more than 90 degrees of rotation of the pinion, which is achieved by using different gearing arrangements between the rack and pinion.

Further, in other alternative embodiments (not shown) other gearing and yoke arrangements are provided between the rack and pinion.

Thus, an actuator is provided which a simple and expedient construction which does away with outer spring chambers and pinion seals.

The invention claimed is:

1. A single sided actuator comprising
a cylinder,
a pressure chamber defined by the cylinder,
a spring return piston and an inner chamber area,
in which a rack extends from an underside of said piston,
in which said rack co-operates with a rotatable pinion mounted in said inner chamber area, and arranged normal to the rack,
in which the pitch line of the rack is substantially aligned with the center of the piston,
in which two or more return springs are arranged within said inner chamber area and are axially situated alongside the rack and the pinion,
in which said return springs are arranged in equal groups of one or more on either side of the rack and pinion, such that the same spring pressure is provided on each side of the rack and pinion to ensure that a linear and balanced spring return force is always provided, and
in which the rack and the pinion are shaped and dimensioned to provide sufficient space for said two groups of springs in the inner chamber area.

2. An actuator as claimed in claim 1 in which the diameter of the inner chamber area is axially aligned with the diameter of the pressure chamber.

3. An actuator as claimed in claim 2 in which the one or more return springs comprise one or more coil springs which are substantially parallel with the cylinder.

4. An actuator as claimed in claim 3 in which the one or more return springs are provided with support means adapted to support said one or more springs along part or all of their axial length.

5. An actuator as claimed in claim 4 in which the support means comprises a rod disposed inside each of said one or more springs.

6. An actuator as claimed in claim 5 in which the one or more rods extend from a bottom of the inner chamber area.

7. An actuator as claimed in claim 6 in which a clearance gap is provided between the one or more rods and the lowest stroke position of the underside of the piston.

8. An actuator as claimed in claim 5 in which the one or more rods extend from an underside of the piston, opposite to the pressure chamber.

9. An actuator as claimed in claim 8 in which a clearance gap is provided between the one or more rods and a bottom of the inner chamber area when the piston is at its lowest stroke position.

10. An actuator as claimed in claim 4 in which a body is disposed within the inner chamber area, in which the support means comprises one or more chambers formed in said body, each of which is adapted to receive one of said one or more springs.

11. An actuator as claimed in claim 10 in which a clearance gap is provided between the body and the lowest stroke position of the underside of the piston.

12. An actuator as claimed in claim 1 in which a screw secures the rack to the piston, and in which the screw is substantially aligned with the center of the piston.

13. An actuator as claimed in claim 1 in which a bearing sleeve is provided in the inner chamber area, which bearing sleeve partially surrounds the rack, and in which a bearing body is provided between the rack and the bearing sleeve.

14. An actuator as claimed in claim 10 in which the body comprises a bearing chamber in which the rack is disposed, and in which a bearing body is provided between the rack and the bearing chamber.

15. An actuator as claimed in claim 13 in which the pinion is mounted on bearings at each end.

16. An actuator as claimed in claim 1 in which the diameter of the pinion body is less than the outer diameter of pinion teeth provided on the pinion.

17. An actuator as claimed in claim 1 in which the piston is provided with a raised central section on its crown and a raised central section on its underside.

18. An actuator as claimed in claim 17 in which the raised central sections are annular in shape.

19. An actuator as claimed in claim 3 in which six coil springs are provided.

20. An actuator as claimed in claim 19 in which one or more of the six coil springs are removable from the actuator such that the spring return force is variable.

21. An actuator as claimed in claim 20 in which the six coil springs provide substantially 100 psi of spring return pressure, in which four of the six coil springs provide substantially 80 psi of spring return pressure, and in which two of the six coil springs provide substantially 60 psi of spring return pressure.

22. An actuator as claimed in claim 19 in which the six coil springs are arranged into two groups of three, each group positioned on one side of a rack extending from the underside of said piston.

23. An actuator as claimed in claim 11 in which the movement of the piston from its highest stroke position to its lowest stroke position rotates the pinion through substantially 90 degrees.

24. An actuator as claimed in claim 23 in which the pinion is provided with three or four teeth.

25. An actuator as claimed in claim 1 in which the actuator is powered with pressurised fluid.

26. An actuator as claimed in claim 1 in which the actuator is a valve actuator.

* * * * *